United States Patent Office 3,538,205
Patented Nov. 3, 1970

3,538,205

METHOD OF PROVIDING IMPROVED LOSSY DIELECTRIC STRUCTURE FOR DISSIPATING ELECTRICAL MICROWAVE ENERGY

Louis E. Gates, Jr., Inglewood, and William E. Lent, Los Angeles, Calif., assignors to Hughes Aircraft Company, Culver City, Calif., a corporation of Delaware No Drawing. Filed Oct. 14, 1966, Ser. No. 586,649
Int. Cl. C04b 35/10, 35/36
U.S. Cl. 264—61 5 Claims

ABSTRACT OF THE DISCLOSURE

A method of making a strong lossy dielectric ceramic for microwave attenuation and high power microwave loads wherein 100–300 mesh silicon carbide particles are encapsulated with an aqueous slurry of ball milled alumina particles having various organic and inorganic binders and modifiers contained therein. The encapsulated silicon carbide particles are then dried, granulated to a size between 28 mesh and 80 mesh, pressed to shape, heated to a temperature of 140° C. to 540° C., to burn out the organic materials, and then fired to about 1400° C. to bond the mixture into a dielectric ceramic.

The invention herein described was made in the course of or under a contract or subcontract thereunder with the Navy Department, and the subject matter of a magnesia matrix, as herein disclosed, has been divided and filed in application Ser. No. 814,830.

This invention relates to improvements in the method of increasing the efficiency of lossy dielectric materials in dissipating high power electrical microwave energy and the products obtained thereby. More particularly, the improvements concern the critical methods of providing an improved lossy dielectric material having the surprising ability to dissipate continuous power wattage on the order of 100 to 1800 watts without requiring external water cooling and can be operated under conditions up to 1200° C. without undergoing physical damage, in comparison to any known commercially available material not having this ability.

In the technical field of providing high performance lossy dielectric material for microwave devices and components, the prior art has devised porous ceramic structures with carbonized sugar, metal oxides and carbides, oxidized nickel-iron alloys in sheet or wire form, and metallic surfaces coated with graphite. However, such structures have characteristics which reduce their use in airborne structures and particularly for use in dissipating high power microwave loads and as attenuators and terminations in traveling wave tubes.

It is accordingly an object of this disclosure to provide the art with a method of fabricating improved lossy dielectric material which improves the efficiency of high power electrical energy dissipation and high thermal conductivity under conditions of continuous wave power.

Another object of this improvement in the art is to provide an improved method of processing for obtaining improved lossly dielectric compositions having high thermal conductivty for efficient absorption and dissipation of heat energy generated under conditions of continuous high energy wave power and environment and induced high temperatures.

A further object of this improvement in the art is to provide a critical method of preforming lossy dielectric compositions for obtaining maximum thermal conductivity, minimizing porosity and attaining high uniform density to more efficiently absorb and dissipate high power microwave electrical energy.

Further, additional objects and advantages will be recognized from the following description wherein the examples are given for purposes of illustrating the improved methods and compositions embodied herein. To the accomplishment of the foregoing and related ends, this invention then comprises the features hereinafter more fully described and inherent therein, and as particularly pointed out in the claims. Such illustrative embodiments being indicative of the various ways in which the principle of our discovery, invention or improvements may be employed.

In general, the lossy dielectric composition of this disclosure consists essentially of critically prepared dielectric matrix and silicon carbide mixtures to provide a lightweight lossy dielectric of uniformly reproducible strength and properties. The disclosure consists essentially of the method for providing a matrix of selective materials whereby the dielectric properties are adjusted within certain limits to obtain improved operating characteristics for microwave attenuators or high power loads. The dielectric constant of the resulting material is within the range 9 to 20 and the loss tangents within the range 0.005 to 0.600, thus providing a range of property values capable of accommodating a wide spectrum of high power microwave energy absorption. Microwave attenuators absorb only a portion of the energy to prevent unwanted oscillations, usually at selected frequencies. Microwave loads (or terminations) are broadband devices designed to absorb and dissipate as heat as much energy as possible. The essential, unusual feature of our materials is that they combine an outstanding range of electrical properties with high density and high thermal conductivity, as a unique combination, not heretofore known to be obtained in the art.

The proportions of matrix and conducting granules vary to provide the required dielectric properties. Attenuators require from approximately 1% to 35% by weight of conducting granules. Loads generally require conducting granules in greater amounts up to about 80%. Thus, in the matrix herein provided the silicon carbide granules may vary from 1 to 80%. It is most important that the conducting granules be uniformly dispersed during the mixing operation so that all particles are separated and surrounded by dielectric matrix. Otherwise, the composite will act as a metallic conductor and will reflect rather than absorb energy. The initial preparation of performing or molding and sintering operations in the preferred compositions are critical from the standpoint of attaining the highest uniform density to maximize thermal conductivity, strength and hardness, and to minimize porosity.

The following detailed descriptions are illustrative of processes and compositions used to prefabricate the herein provided improved lossy dielectric matrix expressed in grams (parts) matrix in which granules of an electrically conducting metallic carbide are essentially uniformly distributed and encapsulated.

First illustrated is a preferred magnesia-based ceramic material fabricated by hot pressing. It has higher superior energy absorbing and dissipating characteristics, making it capable of absorbing and dissipating 1800 watts of continuous wave power without failure and has exceeded the power handling capability of other material known to the art, making possible development and improvement in radar transmission.

EXAMPLE 1

(1) Grind the following for 2 hours in a 1 gal. porcelain mill with 6000 grams of alumina grinding media:

Magnesium oxide [1]—800 grams
Lithium fluoride—22.8 grams
Distilled water—1100 cc.

[1] About 97% based on added dry weight.

(2) Remove from mill and dry for at least 20 hours at 250° F. in an air convection oven.

(3) Micropulverize the dried material.

(4) Mix dry the following for 10 minutes in a paddle-type blender:

| | Grams |
|---|---|
| Micropulverized powder of step 3 | 350 |
| Silicon carbide, 280 mesh | 233 |

(5) Slowly add distilled water until a very thick but well blended paste is formed and continue blending for 30 minutes.

(6) Dry paste completely.

(7) Pulverize to pass a 14 mesh screen.

(8) Calcine in 600 gram batches to 1000° C. for 1 hour.

(9) Hot press 425 grams of the calcined material in a 2-inch diameter induction heated graphite die for ten minutes at 1500° C. under three tons total pressure. Allow to cool slowly and remove.

The composition of Example 1 may be modified within the following limits:

TABLE 1

Lossy ceramic compositions

| | Percent |
|---|---|
| Magnesium oxide | 20–99 |
| Lithium fluoride | 0–5 |
| Calcium pyrophosphate | 0–20 |
| Manganese dioxide | 0–10 |
| Boron phosphate | 0–20 |
| Silicon carbide | 1–80 |

The ceramic material of Example 1 is suitable for use in microwave loads and as terminations in traveling wave tubes. With an eight-gram specimen, 1800 watts of continuous wave power were dissipated without failure of the material. The best commercial material available, when fabricated to this geometry, failed catastrophically when subjected to about 15 watts of continuous wave power. Similarly, the efficiencies of traveling wave tubes have been greatly increased by use of the composition described. The material is otherwise especially suited to applications where medium to low dielectric constants, high thermal conductivities and very high power dissipation are required.

Example 2, a less preferred modified self-glazing lossy matrix composition that is processed by dry pressing and sintering in a ceramic kiln, hence is more inexpensively produced and more amenable to high production, is provided as follows:

EXAMPLE 2

Pregrind

Grind the following ingredients for 16 hours at 55 r.p.m. in a clean, one-gallon porcelain ball mill jar containing 5500 grams of alumina grinding media:

| | Grams |
|---|---|
| Alumina, 900 mesh [1] | 755.2 |
| Manganese dioxide powder | 18.4 |
| Titanium dioxide powder | 18.4 |
| Bentonite | 8.0 |
| Water soluble organic binder (powder) | 8.0 |
| Distilled water (sufficient to form a paste) | 950.0 |

[1] About 94% based on dry weight of added ingredients.

Final grind

Add the following and grind an additional two hours:

| | Grams |
|---|---|
| Silicon carbide grain, 280 mesh | 800 |
| Microcrystalline wax emulsion, 46½% solids concentration (commercial grade) | 112 |

Drying

Drain slip from mill into a glass or porcelain enamelled steel container and then dry at 100–120° C. in an air convection oven for 20–24 hours.

Granulation

Pare off surface crust from the dried cake. Crush the remaining cake until it passes through an 8 mesh screen. Then alternately crush and screen until the dried material is sized between 28 mesh and 80 mesh for pressing.

Pressing

Press bars in a 2" x 1³⁄₁₆" steel die using 65 grams of the sized grain at 30 tons total pressure.

Organic burnout

Place pressed bars on a screen wire rack in an air convection oven. Heat to 140° C. in 4 hours at the rate of 30° C. per hour. Hold temperature at 140° C. for 20–24 hours, then increase temperature to 540° C. at the rate of not more than 100° C. per hour. Remove from oven after cooling below 140° C.

Firing

Place preburned bars on zirconia coated-silicon carbide kiln setters. Fire to 1400° C. for about one hour or until the pyrometric cone (15) is down.

The water soluble organic binder is added to the composition of Example 2, in powder form and is a synthetic or natural organic material, as gum arabic, gum tragacanth, polyvinyl alcohol, methyl, ethyl and the like cellulose and water soluble salts thereof, dextrin, sugar, polyethylene glycol, and the like, and mixtures of such binder materials as are commercially available and known to the art.

The composition of Example 2 may be modified as follows:

TABLE 2

Lossy alumina ceramic composition

| | Percent |
|---|---|
| Silicon carbide, 100 to 300 mesh | 1–85 |
| Alumina, 200 to 900 mesh | 15–99 |
| Manganese dioxide powder | 0–6 |
| Titanium dioxide powder | 0–6 |
| Feldspar | 0–20 |
| Calcium pyrophosphate | 0–20 |
| Nepheline syenite | 0–15 |
| Bentonite | .25–1 |

The material of Exmaple 2 has been successfully used as a microwave load in an iso-duplexer to dissipate microwave reflections from an airborne radar antenna and as a high power broadband load material in the region of 100 watts or more average power dissipation, providing improved microwave switches and other electrical equipment. The material provides the appropriate dielectric constant and loss tangent for this application. The above fabrication process is more suitable for large production at lower cost than that of Example 1. This material, so prefabricated, possesses a high capacity for heat dissipation and high mechanical strength in proportion to its weight for airborne and other electrical components. Although this formulation does not have quite the power dissipating capability of the material described in Example 1, it dissipates at least an order of magnitude of more power without failure than the best commercial material available when fabricated in essentially the same geometry. Due to the improvement in thermal conductivity and ability to withstand high power loads of 100 watts or more average power dissipation, the composition of Example 2 provides an improved high power broadband load material for thermostatic switches and other electrical applications.

The combination of advantages of the material construction are indicated as follows:

(1) The material is unusually efficient in converting microwave energy to thermal energy. Size and weight of components can be greatly reduced.

(2) The material is very refractory and will therefore perform satisfactorily at high temperatures generated at high power levels during continuous operation. The material can be operated to 1200° C. without undergoing physical damage.

(3) The material inherently has a high thermal conductivity for efficient dissipation of the heat generated.

(4) The material is easily outgassed and does not interfere with typical brakeout cycles used in processing microwave power amplifier tubes. The outgassing products (principally sorbed gases) are readily removed.

(5) The material, being dense and hard, is readily machined to precision dimensions required for repeatability in performance.

(6) The formulation process described herein assures excellent reproducibility in preparing subsequent batches of the material.

(7) The material can be metallized and brazed into a metal enclosure which improves heat dissipation and resistance to shock and vibration.

(8) The material is very strong and rugged.

(9) The material has a thermal expansion that is compatible with other materials of construction in microwave devices.

(10) The dielectric properties of the material may be adjusted by composition changes so that matching the material to a particular application is possible.

Having described the present embodiments of our improvement in the art in accordance with the patent statutes, it will be apparent that some modifications and variations may be made wihout departing from the spirit and scope thereof. The specific embodiments described are given by way of examples illustrative of our discovery, invention or improvement which is to be limited only by the terms of the appended claims.

What is claimed is:

1. The method of producing a strong lossy dielectric ceramic for microwave attenuation and high power microwave loads, said ceramic having a dielectric constant in the range of 9 to 20, with the loss tangents in a range of 0.005 to 0.600 and a high thermal conductivity capable of withstanding electrical induced temperature up to 1200° C. and an eight-gram speciment of which is capable of withstanding high power loads of 100 watts or more average power dissipation, the steps comprising:

(1) Pulverizing in a ball mill for about 16 hours a lossy ceramic forming matrix composition consisting of at least two or more of a combination of inorganic particulate materials selected from the group consisting of alumina in the range of 15% to 99% of 200 to 900 mesh, manganese dioxide from 0 to 6%, titanium dioxide 0 to 6%, calcium pyrophosphate 0 to 20%, nepheline syenite 0 to 15%, feldspar 0 to 20%, bentonite about .25 to about 1%, a microcrystalline wax emulsion of about 46½% solids from 0 to about 12% of composition weight, and an organic binder from 0 to about 2.2%, including distilled water in an amount sufficient to form a paste of said ceramic forming composition combination, with and by means of (2) Alumina grinding media in a ratio of about 7-1 of the combined solids weight of said lossy ceramic forming composition;

(3) Add from about 1 to about 85% by weight pulverized particulates of silicon carbide of about 100 to about 300 mesh;

(4) Continue mixing and encapsulating the said silicon carbide particulates with substantially individual coatings of said pulverized paste composition;

(5) Remove the ceramic mixture from the mill and dry the mixture;

(6) Remove the surface crust and granulate the dry mixture to pass an 8 mesh to 80 mesh screen;

(7) Mold pressing the granulated mixture of a screen size on the order of 28 to 80 mesh of step 6 under high pressure, release from the mold pressure, and initially heating the molded form to a temperature of about 140° C. to 540° C. to effect burn out, and (8) Further heating said mold pressed mixture to a temperature on the order of about 1400° C. for about 1 hour or until the pyrometric cone 15 is down, and (9) Cooling said heated mold pressed mixture and obtaining a said dielectric ceramic.

2. The method of claim 1 wherein said ratio of lossy ceramic forming matrix particulates are contained in an amount of about 11% to about 15% solids and said grinding media in a ratio on the order of about 80% to about 90% solids.

3. The method of claim 1 wherein said lossy ceramic composition preparation consists of a mixture in the relative ratio and proportion of about: 755 grams alumina 900 mesh or about 94% of said ceramic mixture based on dry weight of components, about 18 grams manganese dioxide, about 18 grams titanium dioxide, about 8 grams bentonite, and about 8 grams, organic binder mixed with about 800 grams silicon carbide granules, about 112 grams wax binder material and about 950 grams water or sufficient water to form a paste to encapsulate said silicon carbide granules.

4. The method of claim 1 wherein said lossy ceramic forming composition consists essentially of alumina initially including an organic binder in an amount of about ¼% to about 1% based on dry weight of the added components and includes the intermediate step of prefabricating the dry composition under high pressure into bar form and burning out the said organic material in a temperature range of about 140° C. increased to about 540° C. at the rate of about 100° C. per hour.

5. The method of claim 4 wherein said attenuator and lossy ceramic forming components consist of a mixture of about 15 to about 99% alumina, 0 to 6% manganese dioxide, 0 to 6% titanium dioxide, 0 to 20% feldspar, 0 to 20% calcium pyrophosphate, 0 to 15% nepheline syenite, and .25 to 1% bentonite in admixture with distilled water and about 1 to 85% silicon carbide and includes the addition of about 12% of a microcrystalline wax emulsion of about 46½% solids concentration to about 89% of said composition mixture, mold pressing and sintering under atmospheric pressure.

References Cited

UNITED STATES PATENTS

| | | | |
|---|---|---|---|
| 2,601,373 | 6/1952 | Dienel et al. | 264—61 |
| 3,143,413 | 8/1964 | Krapf | 264—332 |
| 3,162,831 | 12/1964 | Heath | 252—516 |
| 3,164,483 | 1/1965 | McCreight et al. | 106—65 |
| 3,291,759 | 12/1966 | Pitha | 252—516 |
| 3,376,367 | 4/1968 | Subramanya | 264—57 |

FOREIGN PATENTS

| | | |
|---|---|---|
| 1,067,918 | 10/1959 | Germany. |
| 501,828 | 4/1954 | Canada. |

JULIUS FROME, Primary Examiner

J. H. MILLER, Assistant Examiner

U.S. Cl. X.R.

106—44, 65; 252—63.5

PO-1050
(5/69)

UNITED STATES PATENT OFFICE
CERTIFICATE OF CORRECTION

Patent No. 3,538,205 Dated November 3, 1970

Inventor(s) Louis E. Gates, Jr. and William E. Lent

It is certified that error appears in the above-identified patent and that said Letters Patent are hereby corrected as shown below:

Col. 1, line 63, "conductivty" should be --conductivity--;
Col. 2, line 46, "performing" should be -- preforming--;
line 58, "higher" should be --highly--;
Col. 3, line 18, "1500°" should be --1550°--;
Col. 4, line 45, "Exmaple" should be --Example--;
Col. 5, line 6, "brakeout" should be --bakeout--;
line 40, "speciment" should be --specimen--.

Signed and sealed this 7th day of September 1971.

(SEAL)
Attest:

EDWARD M.FLETCHER,JR.
Attesting Officer

ROBERT GOTTSCHALK
Acting Commissioner of P.